United States Patent
Tsai

(10) Patent No.: US 6,283,485 B1
(45) Date of Patent: Sep. 4, 2001

(54) FOLDABLE HANDLEBAR STEM OF A SKATE CART

(76) Inventor: Shui-Te Tsai, No. 12, Lane 441, Pu Na Street, Chang Hua (TW)

( * ) Notice: Subject to any disclaimer, the term of this patent is extended or adjusted under 35 U.S.C. 154(b) by 0 days.

(21) Appl. No.: 09/498,720

(22) Filed: Feb. 7, 2000

(51) Int. Cl.$^7$ .................................................. B62K 15/00
(52) U.S. Cl. .................................... 280/87.05; 280/87.041
(58) Field of Search ............................ 280/87.01, 87.021, 280/87.041, 87.042, 87.05, 14.27, 14.28, 650, 655.1; 403/100

(56) References Cited

U.S. PATENT DOCUMENTS

| | | | |
|---|---|---|---|
| 1,213,454 | * | 1/1917 | Brown ............................. 280/87.042 |
| 1,227,888 | * | 5/1917 | Converse ........................ 280/87.041 |
| 1,486,772 | * | 3/1924 | Lopez ................................... 403/100 |
| 1,658,068 | * | 2/1928 | White ............................. 280/87.041 |
| 1,714,698 | * | 5/1929 | Stoll ..................................... 403/100 |
| 2,546,711 | * | 3/1951 | Amendt ............................. 280/87.05 |
| 2,608,337 | * | 8/1952 | Nehler ................................. 403/100 |
| 3,084,949 | * | 4/1963 | Forster et al. .................... 280/655.1 |
| 4,707,884 | * | 11/1987 | Chang .............................. 280/87.041 |
| 5,205,577 | * | 4/1993 | Liu ....................................... 280/650 |
| 5,871,227 | * | 2/1999 | Huang ................................. 280/650 |
| 5,927,733 | * | 7/1999 | Banda ............................. 280/87.041 |
| 6,120,044 | * | 9/2000 | Tsai .................................... 280/87.05 |

FOREIGN PATENT DOCUMENTS

| | | | |
|---|---|---|---|
| 185998 | * | 9/1922 | (GB) ................................. 280/87.05 |
| 281119 | * | 12/1927 | (GB) ................................. 280/87.05 |

* cited by examiner

*Primary Examiner*—Frank Vanaman
(74) *Attorney, Agent, or Firm*—Browdy and Neimark

(57) ABSTRACT

A skate cart includes a horizontal body with a section extending from a front end of the horizontal body, and a rear wheel is connected to a bottom of a rear end of the horizontal body. A tube is pivotably connected to the section and a handlebar stem is connected to the tube. The handlebar stem has a front wheel connected thereto. An engaging device is pivotably connected to the tube and has a first hook end for engaging with a stop on a top of the section when the skate cart is riding, and a second hook end for engaging with the section when the cart is folded. A spring is biased between the engaging device and the tube.

7 Claims, 5 Drawing Sheets

FOLDABLE HANDLEBAR STEM OF A SKATE CART

FIELD OF THE INVENTION

The present invention relates to a skate that has a foldable handlebar stem which is pivoted relative to the horizontal body of the skate cart for convenient storage.

BACKGROUND OF THE INVENTION

A conventional skate cart generally includes a horizontal body on which the rider stands, a handlebar stem connected to a front end of the body and a front wheel connected to the lower end of the handlebar stem, and a rear wheel. The body and the handlebar stem are generally made to be a one-piece member so that the whole skate cart cannot be folded. Therefore, the skate cart occupies a lot of space and is inconvenient for storage.

The present invention intends to provide a skate cart that has an engaging means for connecting the handlebar stem and the horizontal body of the skate cart so that the user may actuate the engaging means to let the handlebar stem be pivoted relative to the body so as to become a compact size.

SUMMARY OF THE INVENTION

In accordance with one aspect of the present invention, there is provided a skate cart and comprising a horizontal body having a section extending from a front end of the horizontal body, and a rear wheel connected to a bottom of a rear end of the horizontal body. A tube is pivotably connected to the section and a handlebar stem is connected to the tube. A front wheel is connected to the handlebar stem. An engaging means is pivotably connected to the tube and includes a first hook end and a second hook end. A spring is biased between the engaging means and the tube. The first hook end is engageable with a stop on the section when the skate cart is riding, and the second hook end is engageable with the section when the tube together with the handlebar stem are pivoted relative to the horizontal body.

The object of the present invention is to provide a skate cart wherein the handlebar stem can be pivoted relative to the horizontal body so as to become a compact size.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
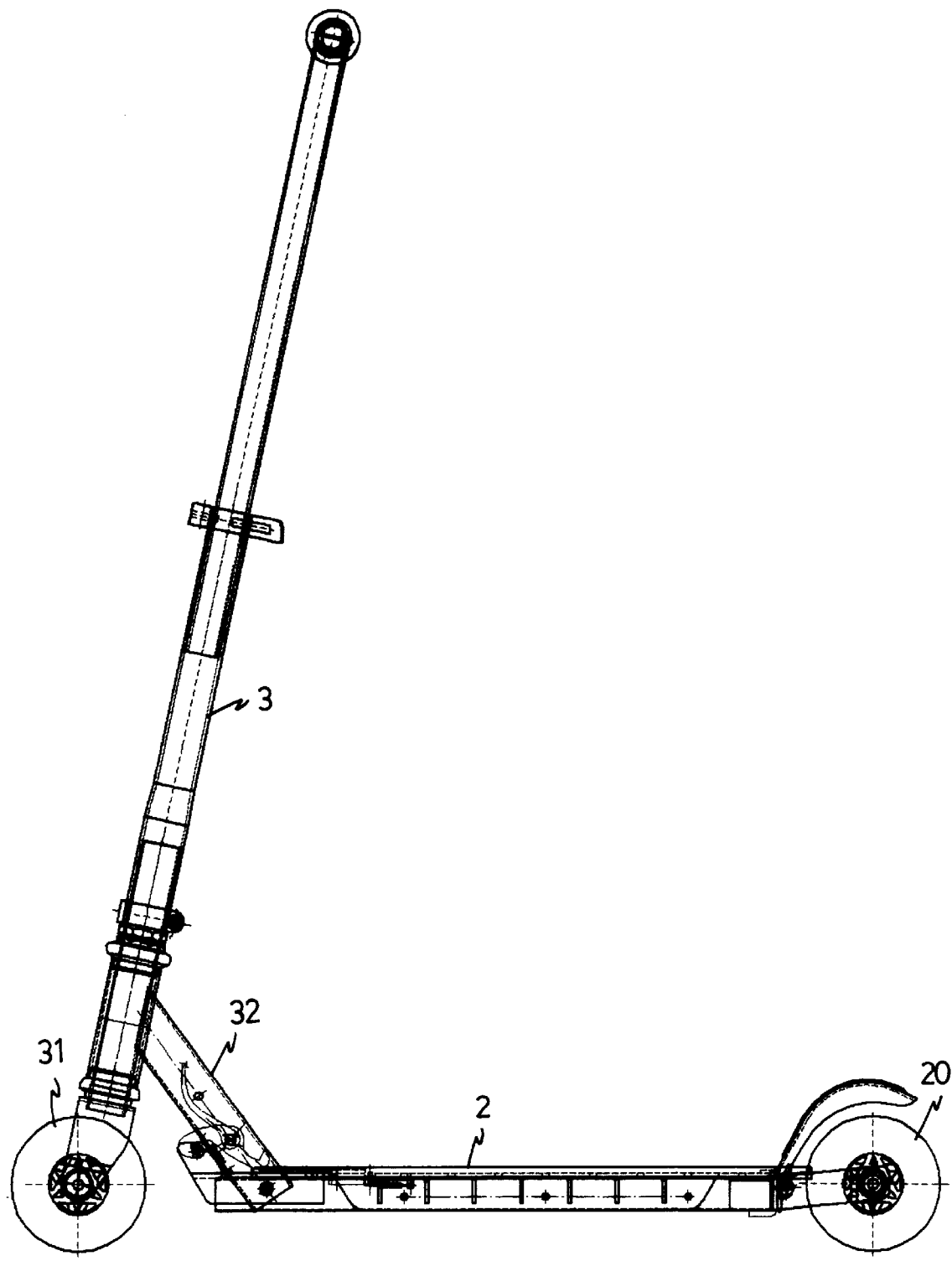
FIG. 1 is a side view to show a skate cart of the present invention.
Figure 2:
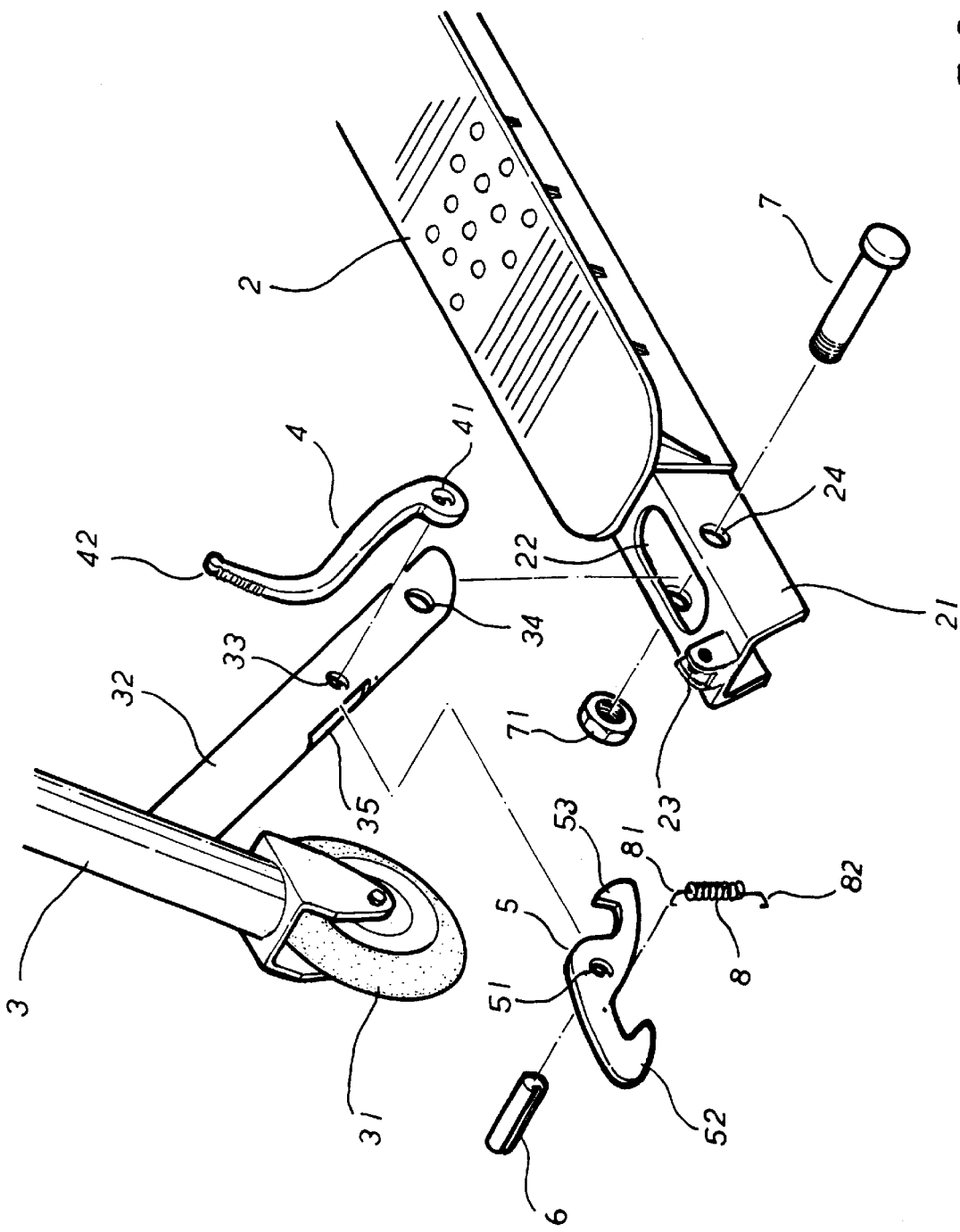
FIG. 2 is an exploded view to show an engaging means of the skate cart of the present invention.
Figure 3:
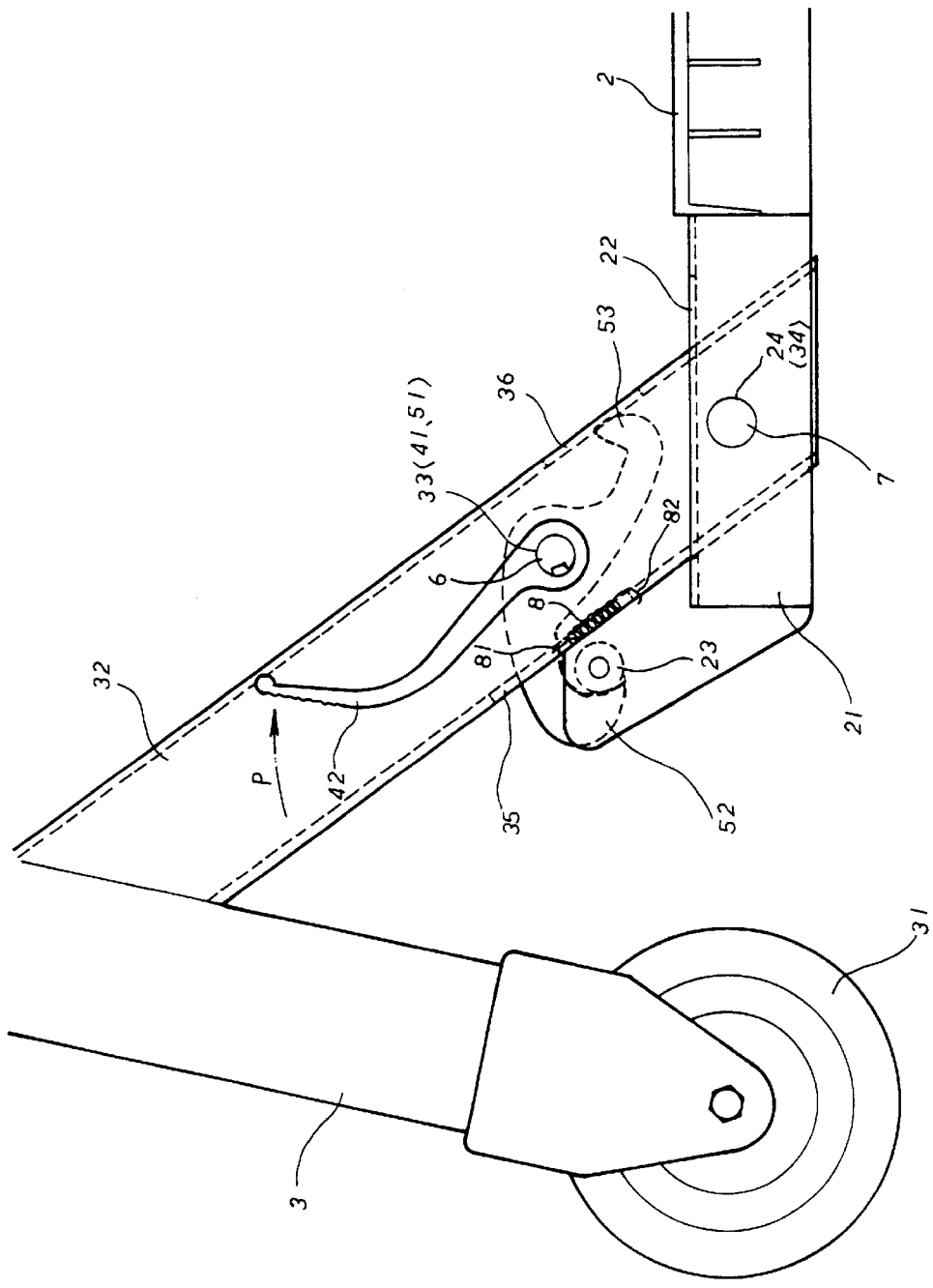
FIG. 3 is an illustrative view to show the first hook end is engaged with a stop on the horizontal body when the skate cart is ready to ride.

Referring to FIGS. 1 to 3, the skate cart in accordance with the present invention comprises a horizontal body 2 having an inverted U-shaped section 21 extending from a front end of the horizontal body 21 and a rear wheel 20 connected to a bottom of a rear end of the horizontal body 2. The section 21 has a through hole 22 defined through a top of the section 21 and a tube 32 is inserted into the hole 22 and pivotably connected to the section 21 by extending a shaft 7 extending through two holes 24 defined through the two sides of the inverted U-shaped section 21 and a hole 34 in an end of the tube 32 and cooperated with a nut 71. A handlebar stem 3 is connected to the tube 32 and a front wheel 31 is connected to the handlebar stem 3. A stop 23 is located on a top of the section 21. Two apertures 35, 36 are defined diametrically through the tube 32.

An engaging means is pivotably connected to the tube 32 and includes a plate 5 and a lever 4. The plate 5 has a first hook end 52 and a second hook end 53 respectively located at two ends of the plate 5. The plate 5 extends through the two apertures 35 and is pivotably connected to the tube 32 by a pin 6 extending through holes 33 in the tube 32 and a central hole 51 in the plate 5. The first hook end 52 extends through one aperture 35 and the second hook end 53 extends from the other aperture 36. The lever 4 is connected to an outside of the tube 32 and one end of the lever 4 has a hole 41 so that the pin 6 is fixedly engaged with the hole 41. The lever 4 further has an operation end 42 on which a knurled surface is defined. A spring 8 has its two ends 81, 82 respectively connected between the plate 5 of the engaging means 4 and the tube 32.

As shown in FIG. 3, when the skate cart is ready to ride, the first hook end 52 is engaged with the stop 23 on the section 21 to let the tube 32 and the handlebar stem 3 be positioned.

Figure 4:
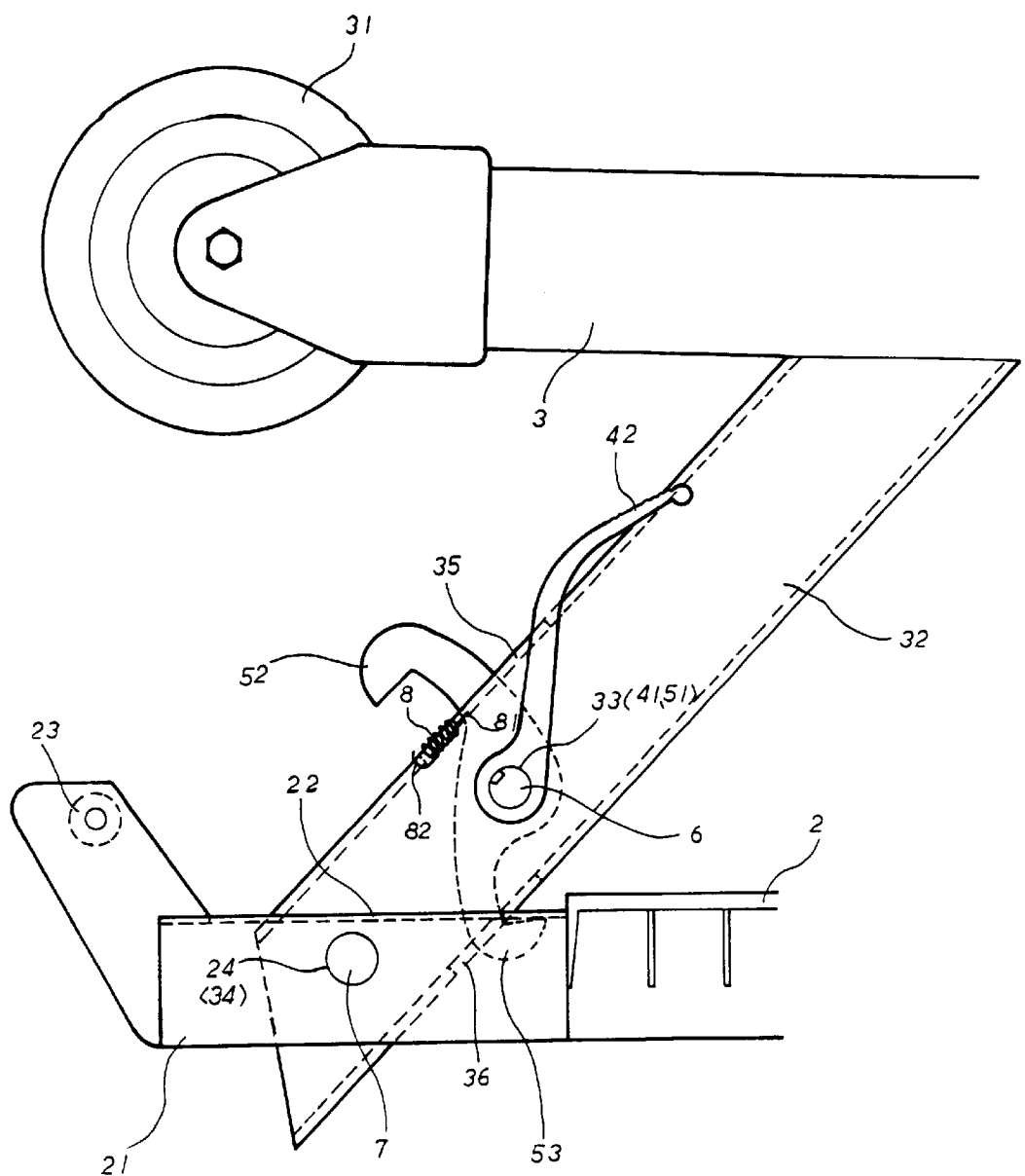
FIG. 4 is an illustrative view to show the second hook end is engaged with an edge of a hole in the section of the horizontal body when the skate cart folded.
Figure 5:
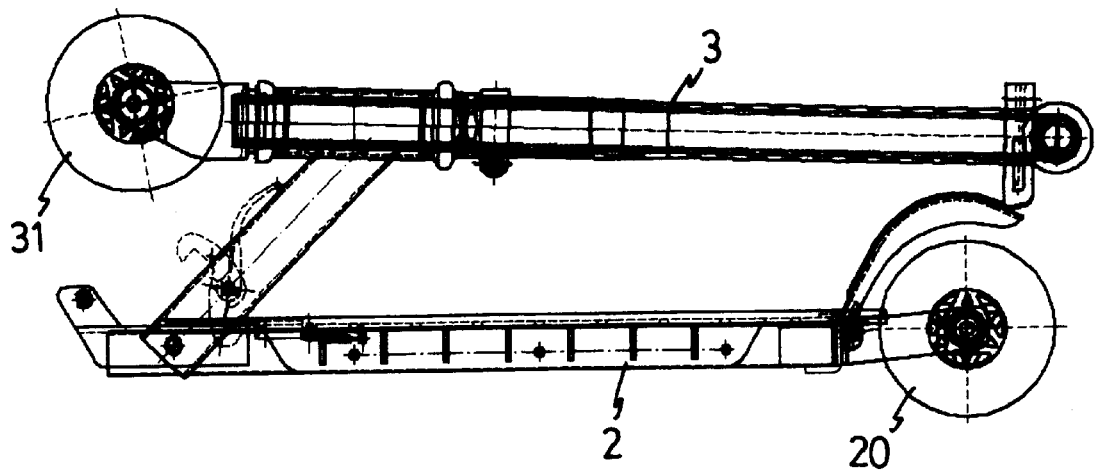
FIG. 5 is a side view to show the folded skate cart of the present invention.

As shown in FIGS. 4 and 5, when the skate cart is to be folded, the user may pull the operation end 42 of the lever 4 to disengage the first hook end 52 from the stop 23, and pivot the tube 32 about the shaft 7 till the second hook end 53 of the plate 5 is engaged with an edge of the hole 22 in the section 21. When pivoting the tube 32, the second hook end 53 is moved to a position below the edge of the hole 22, the lever 4 is then released, the spring 8 will bring the second hook end 53 to engage with the edge of the hole 22.

The skate cart is therefore easily to be folded and easily to be carried or stored in a car trunk.

While we have shown and described various embodiments in accordance with the present invention, it should be clear to those skilled in the art that further embodiments may be made without departing from the scope and spirit of the present invention.

What is claimed is:

1. A skate cart comprising:

a horizontal body having a section extending from a front end of said horizontal body, a rear wheel connected to a bottom of a rear end of said horizontal body, a stop located on a top of said section;

a tube pivotably connected to said section and a handlebar stem connected to said tube, a front wheel connected to said handlebar stem;

an engaging means pivotably connected to said tube and having a first hook end and a second hook end, said first hook end engageable with said stop and said second hook end engageable with said section, and a spring biased between said engaging means and said tube.

2. The skate cart as claimed in claim 1, wherein said section has a through hole defined therethrough and said tube is inserted into said hole and pivotably connected to said section.

3. The skate cart of claim 1, wherein said stop is immovably fixed to said section.

4. A skate cart comprising:
- a horizontal body having a section extending from a front end of said horizontal body, a rear wheel connected to a bottom of a rear end of said horizontal body, a stop located on a top of said section;
- a tube pivotably connected to said section and a handlebar stem connected to said tube, a front wheel connected to said handlebar stem;
- an engaging means pivotably connected to said tube and having a first hook end and a second hook end, said first hook end engageable with said stop and said second hook end engageable with said section, and
- a spring biased between said engaging means and said tube,
- further comprising two apertures defined diametrically through said tube, said engaging means including a plate and a lever, said first hook end and said second hook end respectively located at two ends of said plate, said plate extending through said two apertures and pivotably connected to said tube by a pin, said first hook end extending through one of said two apertures and said second hook end extending from the other aperture, said lever connected to an outside of said tube and one end of said lever mounted to said pin.

5. The skate cart as claimed in claim 4, wherein said spring is biased between said plate and said tube.

6. The skate cart as claimed in claim 4 wherein said section has a through hole defined therethrough and said tube is inserted into said hole and pivotably connected to said section.

7. A skate cart comprising
- a horizontal body having a section extending from a front end of said horizontal body, a rear wheel connected to a bottom of a rear end of said horizontal body, and a stop located on a top of said section;
- a tube pivotably connected to said section and a handlebar stem connected to said tube, and a front wheel connected to said handlebar stem;
- a locking mechanism for respectively locking said front wheel and handlebar stem in a vertical operative position or in a horizontal inoperative position, said locking mechanism comprising a bar (5) pivotably connected within and to said tube, said bar (5) having a first end with a first hook facing in a first direction engageable with said stop in said operative position, and a second end having a second hook facing in a second direction opposite said first direction and engageable with said section in said inoperative position, said bar being biased to provide locking in both said inoperative position and said operative position.

\* \* \* \* \*